(12) United States Patent
Hubbs

(10) Patent No.: US 8,426,016 B2
(45) Date of Patent: *Apr. 23, 2013

(54) SILICONE-IMPREGNATED FOAM PRODUCT WITH FILLERS AND METHOD FOR PRODUCING SAME

(76) Inventor: Charlie Hubbs, Dalton, GA (US)

(*) Notice: Subject to any disclaimer, the term of this patent is extended or adjusted under 35 U.S.C. 154(b) by 81 days.

This patent is subject to a terminal disclaimer.

(21) Appl. No.: 12/657,649

(22) Filed: Jan. 25, 2010

(65) Prior Publication Data

US 2011/0111196 A1 May 12, 2011

Related U.S. Application Data

(63) Continuation-in-part of application No. 12/319,986, filed on Jan. 14, 2009, which is a continuation-in-part of application No. PCT/US2006/019604, filed on May 19, 2006.

(60) Provisional application No. 61/205,827, filed on Jan. 23, 2009, provisional application No. 60/682,824, filed on May 20, 2005.

(51) Int. Cl.
- *B32B 5/18* (2006.01)
- *B32B 37/12* (2006.01)
- *B05D 1/18* (2006.01)

(52) U.S. Cl.
USPC ............ 428/308.4; 428/319.3; 428/319.7; 428/317.9; 428/315.7; 428/317.1; 427/443; 156/281

(58) Field of Classification Search ............ 428/319.3, 428/319.7, 317.9, 315.5, 315.7, 308.4, 317.1; 427/443; 156/281
See application file for complete search history.

(56) References Cited

U.S. PATENT DOCUMENTS

| | | | |
|---|---|---|---|
| 4,978,415 A | 12/1990 | Jones | |
| 5,114,773 A | 5/1992 | Bogdany | |
| 6,156,285 A * | 12/2000 | Adams et al. | 423/335 |
| 6,974,691 B2 * | 12/2005 | Fredenburgh et al. | 435/262.5 |
| 2002/0088396 A1 * | 7/2002 | Caldwell et al. | 118/663 |
| 2009/0047495 A1 * | 2/2009 | Hubbs | 428/220 |

* cited by examiner

*Primary Examiner* — Hai Vo
(74) *Attorney, Agent, or Firm* — Chambliss, Bahner & Stophel, P.C.

(57) ABSTRACT

A resilient structure comprising a carrier layer of open-cell, resilient urethane foam material. The foam material is substantially completely and uniformly impregnated with an impregnant comprising silicone. The impregnant is cured after said impregnation to produce a foamed, open cell, resilient structure wherein the open cells thereof partially comprise the carrier layer of urethane foam material and the silicone includes a filler. A method for producing a resilient structure comprising applying silicone onto a carrier layer of open-cell, resilient urethane foam material, substantially completely and uniformly impregnating the carrier layer with the silicone, and curing the silicone to produce a foamed open-cell, resilient structure wherein the open cells thereof partially comprise the foam material, wherein the structure exhibits properties of the silicone, and wherein the silicone includes a filler.

16 Claims, 2 Drawing Sheets

SILICONE-IMPREGNATED FOAM PRODUCT WITH FILLERS AND METHOD FOR PRODUCING SAME

CROSS-REFERENCES TO RELATED APPLICATIONS/PATENTS

This application discloses subject matter common to and claims the benefit of priority from U.S. Provisional Patent Application No. 61/205,827 filed on Jan. 23, 2009 and entitled "Silicone-Impregnated Foam with Fillers." This application is also a continuation-in-part application of and claims the benefit of priority from U.S. patent application Ser. No. 12/319,986 filed on Jan. 14, 2009 and entitled "Apparatus and Method for Silicone-Impregnated Foam Products" which is a continuation-in-part application of and claims the benefit of priority from PCT/US06/19604 filed on May 19, 2006 and entitled "Silicon-Impregnated Foam Product and Method for Producing Same," which claims the benefit of priority from U.S. Provisional Patent Application 60/682,824 filed on May 20, 2005.

FIELD OF THE INVENTION

The present invention relates to products having a foam carrier or substrate, and particularly to such products employing a urethane foam carrier impregnated with silicone having a filler. The present invention also relates to a method for producing these silicone-impregnated foam products.

This application herein expressly incorporates by reference the entire disclosure present in U.S. Pat. Nos. 4,957,798 and 5,114,773.

BACKGROUND OF THE INVENTION

As noted in the above-cited patents, one of the previous advances in the plastics industry was the development of polyurethane foams which are cellular plastic materials generally formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semi-rigid foams, useful particularly as crash pads; and rigid foams for structural and insulation purposes. The final properties of the urethane foams depend principally on the choice of polyethers, polyesters or other long chain polyhydroxyl compounds which are converted by the polyisocyanate into a high molecular weight polymer which is then foamed by a suitable foaming system, usually a reaction of water with the free isocyanate content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl materials favoring the production of a closed cell structure and the higher equivalent weight polyhydroxyl materials leading to the open-cell structure. The degree of branching of the polyhydroxyl reactant also influences the cell character.

The flexible and semi-rigid foams are processed for the aforementioned applications in a manner such that the foam has a low density, usually from about 1.25 to 4 pounds per cubic foot, and preferably as low a density as is consistent with the provision of a product of adequate strength, etc. Moreover, such flexible and semi-rigid foams should have an open-celled structure for most applications, which is to say that essentially all (i.e., at least about 90 percent), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher and usually have a closed cell structure.

For various applications, however, it is often desired to utilize polymer materials other than polyurethanes, to obtain performance characteristics not provided by or obtainable from polyurethane itself. Unfortunately, however, many other polymer systems do not lend themselves readily to being formed into open cell, resilient structures. Silicone polymers are highly desirable for use as products that will come into contact with the human body, as silicone is substantially inert or non-reactive with the skin. In the health care market, such products would be desirable for paddings for beds or other pieces of furniture, and other resilient products that are designed to come into contact with the body. Silicone polymers are not readily susceptible of being formed into open-cell resilient structures, such as sheets of foamed material.

It would be desirable, therefore, if an apparatus and method could be provided that would produce a foam product that is ignition resistant or flame retardant. It would also be desirable if such an apparatus and method could be provided that would produce a foam product that is resistant to bacteria, fungus and mold and is anti-microbial. It would be further desirable if such an apparatus and method could be provided that would produce a foam product that is resistant to environmental and physical degradation. It would be still further desirable if such an apparatus and method could be provided that would produce a foam product that is relatively light weight. It would also be desirable if such an apparatus and method could be provided that would produce a foam product that is relatively dense and open-celled or breathable. It would be further desirable if such an apparatus and method could be provided that would produce a foam product that is washable.

ADVANTAGES OF THE PREFERRED EMBODIMENTS OF THE INVENTION

Accordingly, it is an advantage of the preferred embodiments of the invention claimed herein to provide an apparatus and method that would produce a foam product that is ignition resistant or flame retardant. It is also an advantage of the preferred embodiments of the invention to provide an apparatus and method that would produce a foam product that is resistant to bacteria, fungus and mold and is anti-microbial. It is a further advantage of the preferred embodiments of the invention to provide an apparatus and method that would produce a foam product that is resistant to environmental and physical degradation. It is a still further advantage of the preferred embodiments of the invention to provide an apparatus and method that would produce a foam product that is relatively light weight. It is another advantage of the preferred embodiments of the invention to provide an apparatus and method that would produce a foam product that is relatively dense and open-celled or breathable. It is also an advantage of the preferred embodiments of the invention to provide an apparatus and method that would produce a foam product that is washable.

Additional advantages of the preferred embodiments of the invention will become apparent from an examination of the drawings and the ensuing description.

SUMMARY OF THE INVENTION

Reticulated polyurethane foam materials are a type of open-cell foam product that are produced using heat and pressure, for example, by igniting gases in a chamber, to form flexible skeletal foam structures with no cell membranes. Reticulated polyurethane foam materials are generally available commercially from a number of sources. The open-pore foam can be produced in various pore sizes with void volumes as high as 98% and 200 ft$^2$ per cubic foot.

It is therefore a principal object of the present invention to provide an improved impregnated foam product having different or improved performance properties (material properties, physical properties) over unimpregnated low-density polyurethane foams, over other foamed polymers, and over other impregnated foam products.

The above and other objects of the present invention are realized by providing an impregnated foam product in which a urethane foam substrate, preferably an open-cell, reticulated substrate, is partially or fully impregnated with silicone which is cured after impregnation to produce a foam-based, substantially open-cell structure having desirable characteristics due to the presence of the silicone impregnant. The preferred polyurethane foam substrate may be either a polyether or a polyester product.

The present invention also provides a method of making an impregnated foam product comprising substantially partially or fully, and uniformly, impregnating a substrate of reticulated or non-reticulated open-cell, resilient foam material with curable silicone, curing the silicone, and forming the product into a final shape. The process may preferably involve the use of a reverse roll applicator to impregnate the foam substrate. The method and product form may further preferably be in a layer form having a predetermined thickness.

The method may also include deforming a substrate layer, for example, compressing the substrate layer to reduce its thickness, as the silicone is cured, to produce a layer product having varied mechanical and physical properties.

The urethane substrate is employed to control or set the gauge (thickness) of the product, and to provide tensile strength in the finished product. The silicone impregnant imparts certain highly desirable characteristics to the product, making the product suitable for a variety of end uses.

Curable silicones suitable for use in the present invention will generally be able to withstand temperatures in a range of −50° F. to +300° F. These silicones will have very low smoke emission in the event that the product is burned, and off gases will have no or very low toxicity. Indoor air quality numbers for the product are excellent, as well. Mineral and/or chemical additives may be added to the silicone to further make the final product ignition resistant. These properties of the finished product make the product potentially highly suitable for use in the aviation, aerospace, and military industries, among others.

The presence of silicone in the silicone-impregnated foam substrate will make the impregnated product mildew-resistant, and will prevent the growth of fungus or mold on the product. Such attributes make the product suitable for use in the health care and cosmetic industries, for example. Silicones also afford excellent protection from UV light.

The product may be produced to be either highly resilient or rigid (effectively no resiliency), or to have a resiliency in between the two extremes. This can generally be achieved through selection of a specific type of silicone to be used as the impregnant, as well as through the amount of impregnant employed per unit of volume of foam substrate, the degree of penetration of the impregnant into the foam substrate, and through the curing process for the silicone.

It is envisioned that a particularly suitable form of the silicone-impregnated foam product will be a resilient layer product, such as may be used as a padding or cushioning layer. For example, the resilient layer form of the product is seen as being especially useful as a cushioned insole for footwear, due to its physical or mechanical properties, as well as the resistance to fungus, mold and mildew formation. Essentially the same characteristics make the product a candidate for use in the furniture industry, for example, as a foam pad or padding layer in upholstered products, a seat cushion, and/or as a top layer in a mattress construction.

BRIEF DESCRIPTION OF THE DRAWINGS

The presently preferred embodiments of the invention are illustrated in the accompanying drawings, in which like reference numerals represent like parts throughout, and in which.

DETAILED DESCRIPTION OF THE PREFERRED EMBODIMENTS

Figure 1:
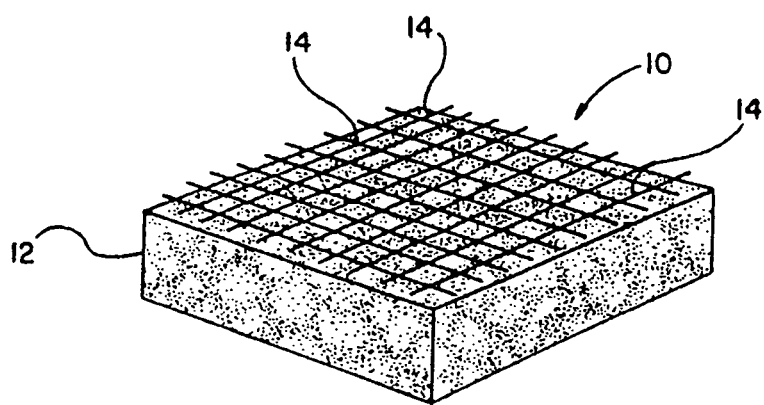
FIG. 1 is an elevational view of a silicone-impregnated foam product in accordance with the present invention, in the form of a resilient layer product.

Referring to FIG. 1, a resilient layer silicone-impregnated foam product according a preferred embodiment of the present invention is indicated generally at numeral 10. Foam product 10 preferably comprises a carrier layer or base foam material 12 which is preferably a low-density, open-celled, reticulated polyurethane foam (either polyester or polyether). FIG. 1 also illustrates that the resilient product of the invention may have a substrate 14, e.g., a backing material, adhered thereto, either by a separate adhesive material, or by curing the impregnant around both the carrier layer and the substrate.

The base foam material 12 is impregnated with an uncured silicone polymer in flowable form, preferably by using a reverse roll applicator, in a method which is described in detail in U.S. Pat. Nos. 4,957,798 and 5,114,773, which are incorporated herein by reference. The silicone polymer is preferably provided in a flowable form, in order that a substantially complete impregnation or distribution throughout the base foam material may be achieved, if desired.

Figure 2:
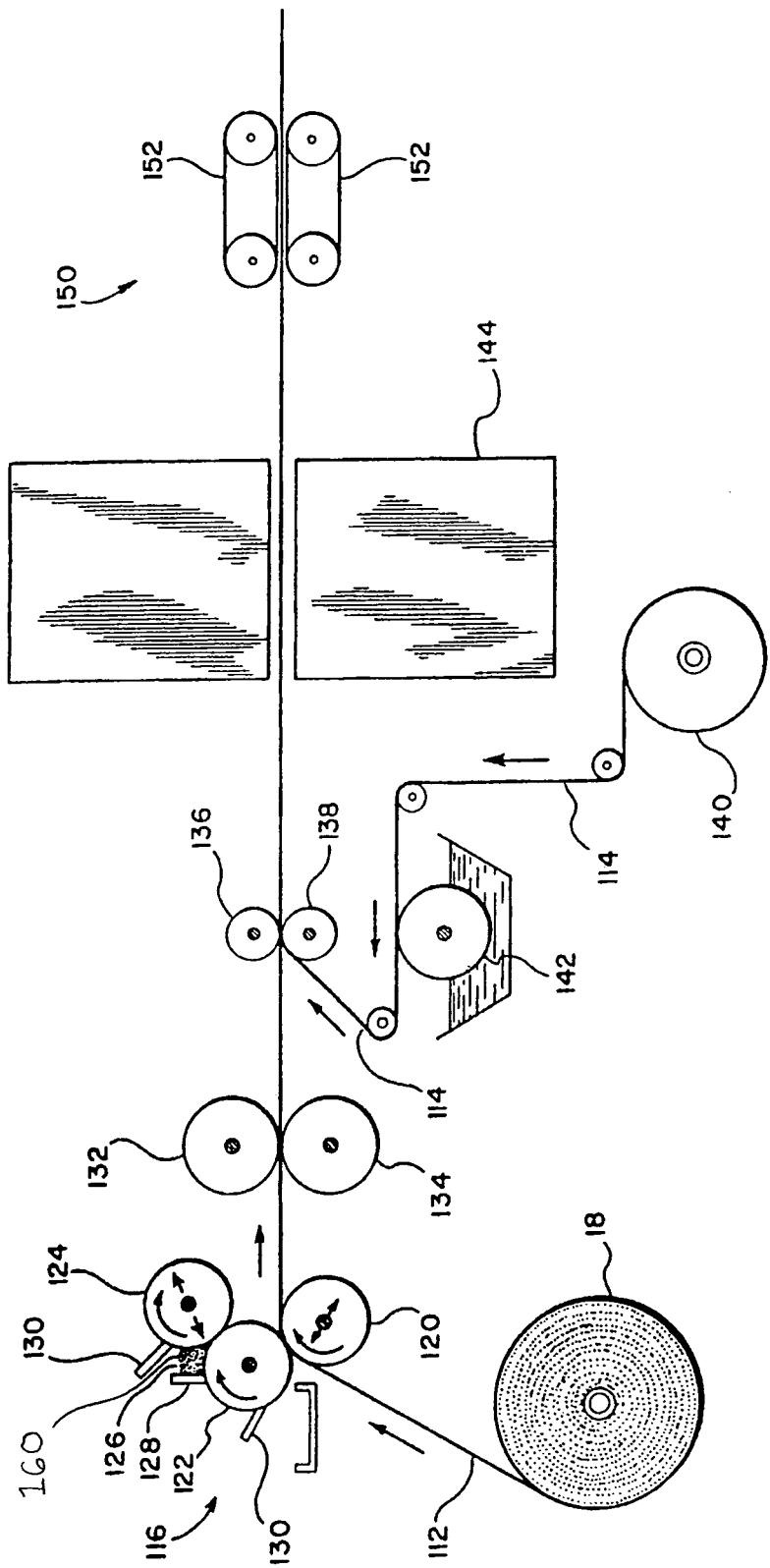
FIG. 2 is a substantially schematic view of an apparatus that may be employed in carrying out the method of the invention in a preferred embodiment thereof.

FIG. 2 is a substantially diagrammatic representation of an apparatus 116 that is suitable for carrying out the process, and for producing a product, in accordance with the present invention. The desired impregnant 126, i.e., a silicone polymer is preferably applied using a reverse-roll applicator. Various other methods of applying the silicone impregnant to the foam carrier may be employed with substantially equal effectiveness. The reticulated, open-celled polyurethane foam base material 112 is fed from a roll 118 over rubber backing roll 120. Transfer roll 122 and metering roll 124 coact to load transfer roll 122 with a predetermined amount of the silicone impregnant 126 from coating dam 128, the silicone impregnant being applied to the polyurethane foam 112 as the foam passes through a nip between transfer roll 122 and rubber backing roll 120. Both transfer roll 122 and metering roll 124 are provided with doctor blades 130, which act to prevent excessive buildup of the impregnant 126 on the rolls. The coating dam 128, and transfer and metering rolls may employ means for more distributing the silicone across the width of the polyurethane foam carrier layer. The arrows included in FIG. 2 are provided to show the direction of travel of the sheets and rollers.

After the impregnant 126 has been applied to the polyurethane foam material, the sheet 112 may be passed between a pair of squeeze rolls 132, 134 which temporarily compress the foam and force the impregnant to fully penetrate and impregnate the entire thickness of foam sheet 112. The foam sheet may then optionally be passed between a pair of laminating rolls 136, 138, at which point a laminate substrate 114 is contacted with the foam sheet on one surface thereof.

The laminate substrate 114 is itself fed from a roll 140, preferably across an adhesive applicator roll 142, and brought into contact with a lower surface of impregnated foam sheet 112 at laminating rolls 136, 138. The foam sheet and substrate are pressed together between rolls 136 and 138, and the impregnant 126, which has preferably not completely dried or cured, is pressed between the fibers of the substrate, thereby coating the fibers as well.

It should be noted that, although the process is described as including the application of adhesive to the substrate prior to contacting the foam sheet material, the impregnant itself may provide sufficient bonding between the foam and the substrate for certain substrates and for certain anticipated uses. In these instances, the application of the adhesive to the substrate may be omitted.

It should also be noted that the padding structure may be produced having a substrate adhered to both the upper and lower surfaces, as will be evident to those skilled in the art upon reading the present specification. Further, the padding material may be produced without having any substrate adhered thereto; in which case the portions of the apparatus employed in applying the substrate may be either idled or omitted from the apparatus entirely.

Optionally, when it is desired to produce a finished product that is of a lesser thickness that that of the initial layer of foam material, the impregnated foam sheet material may be crushed or compressed during at least a final portion of the drying or curing of the impregnant 126, such that the resulting composite open-cell foam product is of a reduced thickness as compared with the original thickness of the foam carrier 112. When the reduced thickness is not desired, the product is simply transported while the impregnant is cured, and then taken up on a roll (not shown), or further processed, as by cutting into sheet form.

The thickness reduction is accomplished by first passing the impregnated foam carrier through a heater 144, and subsequently passing the foam carrier through thickness reduction means 150, depicted in FIG. 2 as a pair of endless belt assemblies 152 disposed on opposite sides of the foam carrier 112, and spaced apart at a predetermined distance substantially equal to the desired thickness of the final padding material to be produced. It is possible to use alternate means for compressing the impregnated foam, for example, using one or more pairs of squeeze knips similar to laminate rolls 136, 138. Each endless belt assembly 152 may preferably comprises at least a first and a second roll, having an endless belt extending around the rolls. At least one of the rolls of each belt assembly will preferably be powered or driven, for example by a drive motor, in a manner well known in the art. The facing surfaces of the belts are spaced apart at a predetermined desired distance, which distance is preferably adjustable by using suitable adjustment means disposed on the apparatus, the spacing distance between the belts being substantially equal to the desired end thickness of the padding material produced in accordance with this embodiment of the invention.

After the foam carrier 112 has been saturated or impregnated with the impregnant 126, in the case where the silicone impregnant is a heat curable silicone, the foam carrier is heated, as for example, by heater 144, which may be an air-circulating oven. The temperature to which the foam carrier/impregnant will be heated may vary depending upon the specific silicone employed as the impregnant. In the case where the silicone impregnant is an RTV silicone, no heater need be provided, or, if present, may be idled. All that is required in that case is that the foam carrier travel a sufficient length of time after being impregnated to allow the silicone to cure or vulcanize.

In the case where a reduced thickness product is desired, upon partial curing of the impregnant, the foam carrier/impregnant is introduced into the thickness reduction means 150, to crush or compress the foam carrier to a desired final thickness. The foam carrier is preferably maintained in a compressed state until the impregnant is substantially fully cured. The cured impregnant serves to freeze the finished product at substantially the thickness to which the foam carrier/impregnant was reduced in the thickness reduction means.

The foam structure which is the end product of this method preferably remains open-celled, in that the foam carrier is preferably not crushed or compressed to the extent that the impregnant completely fills all of the voids in the open cells of the foam carrier as the finished product would lose some if not all of its resiliency at that point. Instead, compression or crushing of the foam carrier will preferably produce an end product having a thicker "coating" of the impregnant on the cell walls of the foam carrier than would the product which is cured in an uncompressed state. The range of crushing or compressing of the foam carrier into an end product, set forth as a percentage of the original foam carrier thickness, may be from about 10% to 90%, and a preferred range will be from about 25% to 75%. The original thickness of the polyurethane foam carrier 112 may be any desired thickness up to about four inches, and even thicker assuming substantially complete impregnation through the thickness of the material can be achieved. Another parameter meriting consideration in practicing the method for producing a compressed open-cell foam structure having the mechanical and physical properties of the impregnant, as opposed to the polyurethane foam carrier, is the weight ratio of the material "added on" to the foam carrier with respect to the total weight of the end product. In this preferred embodiment, the add-on material preferably constitutes from about 15% to about 99% of the total weight.

The composite open-cell structure produced by this method may advantageously be used as a padding material, with the amount of resiliency optionally being controlled to some extent by the percentage reduction in thickness of the structure from the original thickness of the foam carrier. Properties such as resiliency may be varied without changing the composition of the impregnant by instead changing the amount by which the thickness of the structure is reduced. The composite open-cell foam structure will have various uses, as previously mentioned, but the product will generally fall into the category of cushioning products.

Various types of silicone polymers are believed to be suitable for use in impregnating the foam substrate in order to form the product of the present invention. Silicone rubbers and other types of potentially suitable silicone polymers are discussed and described in a publication titled, "SILICONE-Fields of Application and Technological Trends", published by Shin-Etsu Chemical Co., Ltd. The silicone polymers suitable for use in the present invention are preferably curable at or near room temperature, commonly referred to as RTV (room temperature vulcanizable) silicones, although heat-curing silicones are also candidates for use. It is further envisioned that the silicone polymers suitable for use in the invention will be commercially available ones, and should not require custom production. For the particular process and apparatus that is described and illustrated herein, it is preferred that the uncured silicone have a viscosity in the range of about 5,000 cP/mPa*s to about 120,000 cP/mPa*s, and even more preferably in the range of about 8,000 cP/mPa*s to about 70-80,000 cP/mPa*s. It is further desirable in certain process operations to have the viscosity of the silicone at the lower end of this preferred range, for example, in the range of about 10,000 cP/mPa*s to about 12,000 cP/mPa*s. The use of a silicone polymer in this range of viscosities will help to ensure that the polymer is evenly distributed on the substrate, and that it will have sufficient flowability to be able to fully impregnate the substrate through its entire thickness.

The level of silicone polymer loading (quantity as a function of volume of polyurethane foam material), as well as the degree of impregnation (partial or full impregnation), may be selected in order to obtain the desired product characteristics, depending upon the intended end use of the product.

Examples of desired product characteristics include that the product may desirably have a thickness of from about 2 mm, in the case of the use of the product in footwear as a cushioning material, to about 4-6 inches, in the case that the product is produced to function as a mattress for a bed. It is also envisioned that products having thicknesses within this range would be suitable for use as mattress pads that are employed on top of a regular mattress, and other varied uses. The finished density of the product may preferably range from approximately 3 lbs./ft.$^3$ to about 50 lbs./ft.$^3$. The density of the product can be modified to have an effect on the resiliency of the product, as well as on the durability of the product, and other desired product properties. Preprocessing of the polyurethane foam, as by washing the foam with vinegar, may aid in the reduction of adverse reactions between the foam material and the curing silicone product. Certain types of silicone cross-linking agents, such as peroxide and tin based agents, may also improve the compatibility of the curing and cured silicone and the polyurethane foam. It will be understood by those skilled in the art that the particular silicone polymer selected may also depend upon the properties desired in the final composite structure and application to which it is to be put.

As noted previously, various additives may be introduced into the uncured, flowable silicone polymer, in order to obtain further desired material properties in the product of the present invention. It is envisioned, for example, that alumina trihydrate will be used as an additive to the uncured silicone in situations where improved flame retardancy of the final product is desired. In addition, suitable conventional fillers, coloring agents, curing agents, or other adjuvants may be incorporated in the silicone polymer composition prior to impregnation. The foam base material 12 may thus be considered to be a substrate or carrier for the silicone polymer, providing a matrix or structure around which the silicone may be cured into final form. The finished product will have essentially the material and physical properties of the silicone polymer, while being in the form of a foamed layer or product. This yields a product simulating a silicone foam product without actually having foamed the silicone material. Potential uses for the product of the present invention exist in the medical, health care, retail, cosmetic, aerospace, military, and furniture markets.

In addition, it is contemplated within the scope of the invention that the silicone-impregnated foam products could also include fillers 160 such as light weight fillers adapted to reduce the total weight of the foam product. The preferred light weight fillers are microspheres. More particularly, the preferred embodiments of the invention include light weight fillers having a final density of 100 kg/m$^3$ and a particle size in the range of 1μ and 750μ. The light weight fillers can be mixed into silicone or synthetic latex and then impregnated into urethane or reticulated urethane foam. While microspheres, which are tiny plastic or rubber spheres filled with gas, are a preferred light weight filler, it is contemplated within the scope of the invention that other suitable light weight fillers may be used.

It is also contemplated within the scope of the invention that anti-microbial fillers can be added to the preferred embodiments of the silicone-impregnated foam product of the invention. More particularly, silver ion based fillers can be mixed into the silicone or synthetic latex and then impregnated into the urethane or reticulated urethane foam product. Preferably, the anti-microbial filler is permanently fused with the silicone or synthetic latex coating. The increased surface area of the urethane and reticulated urethane foam product provides an excellent carrier for anti-microbial fillers. Laboratory testing of the preferred silicone-impregnated foam product with anti-microbial fillers has resulted in a greater than 99% effectiveness rate against bacteria such as *E. coli* (*Escherichia coli*) and MRSA (Methicillin-resistant *Staphylococcus aureus*). The preferred silicone-impregnated foam product with anti-microbial fillers has also been successful in preventing fungus and mold to develop on the product. While silver ion is a preferred anti-microbial filler, it is contemplated within the scope of the invention that other anti-microbial fillers such as nano-silver, synthetic arsenic and the like may also be used.

It is also contemplated within the scope of the invention that flame retardant fillers may be added to the preferred embodiments of the silicone-impregnated foam product of the invention. The preferred flame retardant fillers include hydrate, antimony oxide, deca-bromine, phosphates, chlorinated paraffins and graphite. Using different flame retardant fillers in different amounts provides a silicone-impregnated foam product that can range from being flame retardant to a flame barrier. While hydrate, antimony oxide, deca-bromine, phosphates, chlorinated paraffins and graphite are the preferred flame retardant fillers, it is contemplated within the scope of the invention that other suitable flame retardant fillers may also be used.

In use, several advantages of the preferred embodiments of the invention are achieved. For example, when flame retardant fillers are added to the preferred embodiments of the silicone-impregnated foam product of the invention, the product can be made to be ignition resistant or flame retardant. This is particularly advantageous in bedding and filtration applications. When anti-microbial fillers are added to the preferred embodiments of the silicone-impregnated foam product of the invention, the product can be made to be resistant to bacteria, fungus and mold and anti-microbial. This is particularly advantageous in medical applications. When light weight fillers are added to the preferred embodiments of the silicone-impregnated foam product of the invention, the product can be made to be relatively light in weight, especially when compared to gel products. This is particularly advantageous in sports applications such as baseball glove components, football helmet padding, shoulder pads, chest protectors, knee and elbow pads, shin guards, cups, sports braces, athletic clothing inserts or components, athletic shoes (running, tennis, soccer and other cleated shoes) and the like.

In addition, the preferred embodiments of the silicone-impregnated foam product of the invention achieve greater durability than conventional foam products by resisting environmental and physical degradation. This is particularly advantageous in cushion and gasket applications. Because the silicone or latex coating fully encapsulates the matrix of the foam, the foam is protected against environmental degradation such as oxidation. The coating also blocks sources of environmental degradation such as moisture and UV radiation. It is contemplated within the scope of the invention that UV radiation inhibitors may also be added to the coating and that an acrylic coating could be applied the product to further inhibit UV radiation.

Laboratory testing has shown that the preferred silicone-impregnated foam product is resistant to urine soiling and demonstrates improved durability after repeated cleanings with disinfectants. Laboratory testing has also shown that the preferred embodiments of the silicone-impregnated foam product is resistant to accelerated heat aging and increases in immersion and interface pressure over time. Indeed, the preferred silicone foam product demonstrated only a 0.5% increase in immersion and only a 0.6% increase in interface pressure between year 1 of simulated use and year 7 of simulated use in laboratory testing. By contrast, an untreated foam product failed after only 1 year of simulated use. These characteristics are particularly advantageous in cushion, bedding and medical applications.

The silicone or latex coating of the preferred embodiments of the invention also provides additional firmness to the base foam product which can be made to be relatively dense and open-celled or breathable. In addition, the preferred embodiments of the invention can be made to be washable in conventional washing machines and driers. This is particularly advantageous in clothing and bedding applications. It is also advantageous in cleaning applications such as sponges, dish scrubbers, floor scrubbers and the like.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A resilient composite structure comprising:
   a carrier layer of reticulated, open-cell, resilient polyurethane foam material, said resilient polyurethane foam material being substantially completely and uniformly impregnated with an impregnant comprising a curable silicone polymer and a filler; the impregnant being cured into a substantially elastomeric solid after said impregnation to produce a highly-durable, foamed, open-cell resilient composite structure wherein the impregnant partially coats the cell walls of the open cells of said carrier layer of resilient polyurethane foam material;
   wherein said impregnant has a viscosity in the range of about 10,000 cP/mPa's to about 12,000 cP/mPa's, being evenly distributed throughout the polyurethane foam material; and
   wherein said structure, after said silicone polymer is cured, is of a thickness that is less than an initial thickness of said carrier layer.

2. The resilient composite structure as defined in claim 1 wherein said carrier layer has a thickness in the range of about 80 to 650 mils.

3. The resilient composite structure as defined in claim 1 wherein said filler is an anti-microbial filler.

4. The resilient composite structure as defined in claim 1 wherein said filler is a light weight filler.

5. The resilient composite structure as defined in claim 1 wherein said filler is a flame retardant filler.

6. The resilient composite structure as defined in claim 1 further comprising a substrate securely adhered to said impregnated foam material, said substrate extending completely across at least one surface thereof.

7. The resilient composite structure as defined in claim 6 wherein said substrate is adhered to said impregnated foam material by an adhesive, said adhesive being a component independent of said impregnant.

8. The resilient composite structure as defined in claim 1 wherein said resilient composite structure has a thickness in a range between about 2 mm and about 6 inches.

9. A method for producing a resilient composite structure comprising:
   applying, onto a carrier layer of reticulated, open-cell, resilient polyurethane foam material, an impregnant and substantially completely and uniformly impregnating said carrier layer with said impregnant which includes a curable silicone polymer and a filler;
   curing said silicone polymer to produce a foamed open-cell, resilient polymer composite structure wherein the silicone polymer partially coats the cell walls of the open cells of said carrier layer of resilient polyurethane foam material, the open cells thereof partially comprise said foam material, and wherein said impregnant has a viscosity in the range of about 10,000 cP/mPa·s to about 12,000 cP/mPa·s, being distributed throughout the polyurethane foam material; and
   wherein said composite structure, after said silicone polymer is cured, is of a thickness that is less than an initial thickness of said carrier layer.

10. The method as defined in claim 9 wherein said carrier layer has a thickness in the range of about 80 to 650 mils.

11. The method as defined in claim 9 wherein said filler is an anti-microbial filler.

12. The method as defined in claim 9 wherein said filler is a light weight filler.

13. The method as defined in claim 9 wherein said filler is a flame retardant filler.

14. The method as defined in claim 9 further comprising a substrate securely adhered to said impregnated foam material, said substrate extending completely across at least one surface thereof.

15. The method as defined in claim 14 wherein said substrate is adhered to said impregnated foam material by an adhesive, said adhesive being a component independent of said impregnant.

16. The method as defined in claim 9 wherein said resilient composite structure has a thickness in the range of 2 mm to 6 inches.

* * * * *